Patented May 30, 1933

1,911,537

UNITED STATES PATENT OFFICE

ROBERT R. TANNER, OF DETROIT, MICHIGAN, ASSIGNOR TO METAL FINISHING RESEARCH CORPORATION, OF MORENCI, MICHIGAN, A CORPORATION OF MICHIGAN

COATING METAL WITH AN ORGANIC SALT OF THE METAL

No Drawing.   Application filed July 14, 1930. Serial No. 467,958.

This invention has for its object the production of a coating on iron, steel or the like, comprising a metallic salt of an organic acid, which salt is suitable for forming a rust resisting coating, or which is suitable for forming a foundation coat for paint, enamel or the like protective material.

A further object of the invention is to accelerate the production of the kind of coating described, and to improve its qualities.

Further details and objects of the invention will appear as the description proceeds.

First there will be outlined the groups of organic acids which may be employed with some success in producing a coating of the kind desired, and then there will be outlined ways in which the action of various acids may be accelerated and other details concerning the use of various acids and their adaptation to specific purposes.

It has long been known that a dilute solution of phosphoric acid, when it was properly "balanced" and other necessary conditions were observed, would produce upon iron or steel a coating of substantially insoluble phosphates, such coating acting of itself to deter rusting and also forming a good foundation for certain additional protective coatings.

It has been discovered that various organic acids may be employed, under proper conditions, to form similar coatings of salts of the metal treated, and that some of the coatings thus formed have qualities making them useful for rust deterrent purposes, or for foundation coatings, or for both purposes.

In the aliphatic series of organic acids, only the dicarboxylic acids and the hydroxy-dicarboxylic acids have been found suitable for the purposes of this invention. In the aromatic series, carboxylic acids having but one carboxyl group and sulphonic acids, such as benzene sulphonic acid, have been found operable to some extent under proper conditions.

A common characteristic of all of these acids appears to be that the pure cold solution, at whatever strength, does not act on the metal to a material extent during any reasonably short length of time. Heating the solution is sufficient to render the action quite prompt with a few of the acids, but with most of them accelerating agents are either necessary or highly advantageous in producing a coating within a reasonably short time. In some instances the hot solution begins coating at once, in almost any concentration. In other cases, no coating is produced until after some metal has been dissolved in the solution, producing a balancing salt.

The best of the pure hot solutions are oxalic, malonic, tartaric, salicyclic, gallic, and benzene-sulphonic acids, which produce coatings within from 2 to 15 minutes. Also, a hot solution of succinic acid, with the addition of manganese dioxide, produces a coating in about five minutes.

The action of most of the acids listed above is accelerated by the addition of an oxidizing agent, but the effect is markedly different with different acids, and also varies somewhat with different oxidizing agents. For example, a hot solution of benzoic acid produces a merely semi-adherent coating in 45 minutes, and a hot solution of anthranilic acid produces no coating, at least within any reasonable period. With the addition of sodium sulphite, a hot solution of either of these acids produces a coating in five minutes. Also, a pure solution of oxalic, malonic or tartaric acid has no appreciable coating action when cold, but the addition of sodium sulphite to any of these solutions so expedites its action that it produces a coating within from one to three minutes. Succinic and salicylic acids are exceptions to the rule, in that the addition of sodium sulphite to their solutions does not greatly accelerate their action. The addition of sodium sulphite to a solution of gallic acid renders the coating darker in color and more adherent and resistant, although it does not speed up the action to the degree that it does with oxalic acid.

The addition of manganese dioxide appears to be advantageous in all cases. In most instances, it produces a marked acceleration in the action, and it also improves the quality of the coating in most instances.

Although the action of the organic acids listed above bears some resemblance to that of phosphoric acid, there are differences which readily appear from the above description. Furthermore, while a dilute solution of either phosphoric acid or oxalic acid may be used to coat iron, the two acids are mutually poisons. The addition of a very small amount of oxalic acid to a good coating-solution of phosphoric acid slows up the coating action and impairs the quality of the coating formed. An increase in the oxalic acid increases the deleterious effect. On the other hand, a dilute solution of oxalic acid is slowed up by a small quantity of phosphoric acid, and becomes increasingly ineffective as the phosphoric acid is increased. However, a strong or saturated solution of oxalic acid will tolerate a limited amount of phosphoric acid without noticeable effect.

Generally speaking, a single one of the organic acids mentioned is more effective than a mixture thereof; but an exception to this rule is that the addition of a small percentage of succinic acid to a solution of oxalic acid accelerates the action of the solution. Succinic acid does not act as an accelerator for other acids of the group mentioned.

Both because of its availability and because of the promptness of its action, a solution of oxalic acid is preferred for forming a foundation coating over which paint, enamel or lacquer is to be applied.

It is well known that paint, varnish, enamel, and the like does not adhere satisfactorily to the plain surface of iron, steel or zinc. It is desirable to form a coating upon the surface of the metal which is at once firmly adherent to the metal and such as affords a surface to which paint, enamel or varnish will adhere firmly. To accomplish this purpose, an aqueous solution of oxalic acid is formed. This solution may vary widely in strength, as will be explained more fully below. The solution may be used substantially pure, and its use in this manner will be described first. The metal to be coated is dipped in the solution and allowed to remain therein until reaction ceases. The reaction is indicated by bubbles given off at the surface of the metal. When these bubbles cease to arise from the surface of the metal, reaction is complete and the metal may be removed. The time of reaction varies greatly with temperature. At ordinary room temperature, coating reaction has not been obtained without an accelerator, but at boiling temperature or at a temperature closely approaching boiling, the reaction is completed within a few seconds or minutes, according to circumstances.

It is not necessary for the surface of the metal to be absolutely clean, but it should be approximately so. Any grease on the surface noticeably slows up the action with a dilute solution. With a strong solution, and with accelerators mentioned below, a little grease is not troublesome. Pickling the surface of bright metal in any ordinary pickling solution, and thereafter rinsing the pickled surface, increases the rapidity of the reaction in the oxalic acid bath. Even a brief immersion in a pickling solution has a noticeable effect upon the time of subsequent reaction in the oxalic acid bath, especially where the surface of the metal is very smooth.

The coating formed upon the surface of the metal is exceedingly uniform and fine-grained and, therefore, does not add any physical roughness to the surface, but it does change the character of the surface so that paint, enamel or varnish clings thereto firmly, and the oxalate coating being substantially integral with the coated metal, the paint, varnish, or enamel is thus firmly bonded to the metal.

With clean metal, the strength of the solution does not seem to have any material effect upon the rapidity of the action from a solution containing not more than one-fifth of one percent of oxalic acid up to a saturated solution. Furthermore, the treatment of articles in the bath does not have any noticeable effect upon the bath, except very gradually to weaken the solution. For this reason, exceedingly little care is necessary in maintaining the bath at a proper strength, as the reaction takes place substantially the same within such very wide limits of concentration. For practical purposes, all that is necessary is that the water shall contain some oxalic acid.

The coating formed on an iron surface by oxalic acid, used alone, is mainly ferrous oxalate. This material is extremely insoluble in water and would be expected to form a good rust-proofing coating. However, it has been found upon testing coatings for rust-proof properties in a salt spray that rust is obtained in from two to three hours, and when left in aerated water over night, the whole surface appears extremely rusty. This rust, however, can be wiped off and the the coating underneath appears just as good as it was before placing in the aerated water.

Although the coating cannot be recommended as rust-proof in itself, it has been found to be a very good coating as a base for paint or enamel. For example, certain panels prepared in the usual manner and without an oxalate coating were provided with two coats of baked enamel and submitted to a salt spray until badly rusted. Even where the rust did not appear on the surface, the enamel peeled off very readily. Other panels similar in every respect were provided with the oxalate coating as a base and then given precisely similar coats of baked enamel and, after subjection to a salt spray for many times the period necessary to rust the first batch of panels, were found to be in perfect condition and the enamel to be perfectly adherent at all points.

In coating iron in the manner described, it has been found that the coating operations may be performed somewhat more rapidly with the presence of certain materials besides oxalic acid in the bath. For example, manganese dioxide added to the bath dissolves therein to some extent and results in a somewhat blacker coating containing some manganese, the time of reaction is speeded up and the resultant coating is somewhat firmer than with the oxalic acid alone. A somewhat similar result is attained by adding a compound of chromium which will be at least partially dissolved in the solution, and the same is true of copper and silver. On the other hand, there is a very wide range of compounds of other metals which may be permissible in the bath without having any particular effect thereon one way or the other. Compounds of arsenic must be avoided, as they have a very detrimental effect. In general, any compound containing, or which will free in the bath, any acid stronger than oxalic acid, is detrimental, especially with a weak solution of oxalic acid; but acids and salts of acids which may act as oxidizing agents, accelerate the action. As mentioned above, sodium sulphite has such an effect, and sodium nitrite acts in a similar way. Hydrogenperoxide also is very effective as an accelerating agent.

It will be readily understood that the introduction into the bath of any other material which does not enter into the coating, or act in some way as a catalyst, is not beneficial in any way and if it has any action whatever, such action is detrimental. As above indicated, manganese, copper and chromium enter into the coating to some extent, and seem to increase the rate of reaction and not to injure the quality of the coating for most purposes, but only small amounts of these materials are useful.

Under perfect conditions, a bright iron or steel article sand-blasted or submitted to one minute pickling in an ordinary pickling solution and then rinsed, will react with a boiling solution of oxalic acid containing a little manganese dioxide, to form a complete coating, so that reaction stops, in as little as thirty seconds; and surfaces of iron or steel in other conditions and in an oxalic acid solution free from foreign substances reacts to completion within a few minutes; but in spite of this prompt reaction to form an oxalate coating on the surface of the metal when the metal article is suspended in the solution, it has been found that when the solution is sprayed or placed upon the metal surface under ordinary heat conditions, the solution dries thereon without having any perceptible coating effect whatever upon the metal. It acts as a cleaner, but any crystals deposited on the metal are of oxalic acid and readily brushed off or washed off, and no perceptible coating of insoluble firmly adherent, ferrous oxalate is formed. At ordinary room temperatures, even if the article is dipped in the solution and remains therein, it requires a greater length of time than has yet been tried to form any appreciable oxalate coating thereon.

When an oxidizing agent, such as sodium sulphite is added to an oxalate solution, the action is accelerated so that a cold solution can be used, or one at room temperature. Only a little of the oxidizing agent is necessary. For example, a good solution can be formed by adding one part of sodium sulphite to fifteen parts of oxalic acid, preferably with a small amount of manganese dioxide added, one-fortieth as much manganese dioxide as oxalic acid being a satisfactory proportion, but wide variation from this proportion being permissible. In such a solution, at room temperature or slightly warmer, a satisfactory coating for a paint foundation can be formed in one minute. Merely wetting the metal with the solution does not appear to give satisfactory results; but a coating can be formed either by immersing the metal in the solution or by flowing the solution over the metal.

Great quantities of metal may be treated in a solution without the necessity of adding any sodium sulphite. It has not been fully determined whether the sodium sulphite acts purely as a catalyst or has some other action, but it is certain that it is used up very slowly, if at all, by the reactions taking place, while it very greatly accelerates the action. As indicated above, it makes possible the use of a cold solution of oxalic acid and other acids which would otherwise act only when hot, and it makes operable the hot solution of other acids which without it are ineffective.

Of the other acids, tartaric acts much like oxalic, but not quite so quickly.

Of the various acids mentioned, gallic acid is particularly suitable for a coating which is rust resistant, per se. The coating formed by gallic acid, with the addition of manganese dioxide and sodium sulphite, is capable of taking a high polish, which gives it the appearance of black enamel. Unlike the oxalate coating, the gallate coating is quite resistant to rust, being in the class with phosphate coatings in this respect.

The speed of reaction is varied by many influences, but a five percent solution of gallic acid, for example, with the addition of sodium sulphite, will produce a satisfactory coating under normal conditions in about ten minutes, at from 40° C. to 50° C. The addition of manganese dioxide renders the coating blacker and apparently somewhat firmer. The addition of a very small amount of phosphoric acid to the gallic acid solution changes the nature of the coating, rendering it grayer in color and somewhat smoother in texture. As indicated above, such a coating is substantially equivalent to a phosphate coating for rust resisting qualities, and it can be formed much more quickly than the pure phosphate coating. In addition, it will take a high polish without the addition of any other material and does not form such coarse crystals as are formed sometimes in phosphate coatings.

While the method herein claimed is primarily intended for coating iron or steel, an analogous result may be obtained on zinc.

As indicated above, a wide variation in proportions can be made, and different accelerating agents may be employed as conditions render desirable. Also, the proportions of the accelerating agents can be varied widely, at least with the more active acids. While any of the different acids indicated above may be used with some success, oxalic acid, or a combination of oxalic and succinic acid, with proper accelerators, is preferred for forming a foundation coating while gallic acid is preferred for forming a coating which is rust proof, per se.

Sodium sulphite and sodium nitrite sometimes act as reducing agents, but in the presence of reducing agents, they act as oxidizing agents. Oxalic acid is a stronger reducing agent than most of the organic acids mentioned above, and it may be for this reason that the action of oxalic acid is accelerated by sodium sulphite to a greater degree than is the action of some of the other acids. In the appended claims, the term "oxidizing agent" is intended to cover materials which have an action, when added to the particular solution employed, similar to the action of sodium sulphite when it is added to a solution of oxalic acid.

Sodium nitrite seems to be an equivalent of sodium sulphite, and in the appended claims, it is to be understood that sodium nitrite may be substituted in each instance for sodium sulphite without material change in the results, and therefore is an equivalent.

What I claim is:

1. The method of coating an approximately clean surface of a metal of the group consisting of iron, steel, zinc and their alloys, which consists in subjecting the surface of the metal to the action of a solution containing, as the major portion of its active chemicals, one of the acids included in dicarboxylic and hydroxydicarboxylic acids of the aliphatic series and carboxylic acids, having but one carboxyl group, and sulphonic acids of the aromatic series, and its balancing salts, employing accelerating means included in the group consisting of heat, oxidizing agents and compounds of the metals manganese, copper, chromium and silver, and continuing the action of said acid on the metal of said surface until there is formed on the metal a firmly adherent coating of a salt of the metal and acid used, which coat is not readily soluble in water and is suitable for binding paint to the metal.

2. The method of coating an approximately clean surface of a metal of the group consisting of iron, steel, zinc and their alloys, which consists in subjecting the surface of the metal to the action of a solution containing as its chief active chemical one of the acids included in dicarboxylic and hydroxydicarboxylic acids of the aliphatic series and carboxylic acids, having but one carboxyl group, and sulphonic acids of the aromatic series, and its balancing salts, employing accelerating means included in the group consisting of oxidizing agents and compounds of the metals manganese, copper, chromium and silver, and continuing the action of said acid on the metal of said surface until there is formed on the metal a firmly adherent coating of a salt of the metal and acid used, which coat is not readily soluble in water and is suitable for binding paint to the metal.

3. A method in accordance with claim 2 and in which the accelerating means comprises an oxidizing agent.

4. A method in accordance with claim 2 and in which the accelerating agent comprises sodium sulphite.

5. A method in accordance with claim 2 and in which the accelerating means comprises a soluble compound of one or more of the metals manganese, copper, chromium or silver.

6. A method in accordance with claim 2 and in which the accelerating means comprises manganese dioxide.

7. A method in accordance with claim 2 and in which the accelerating means comprises a soluble compound of one or more of the metals manganese, copper, chromium, or silver, and which is further accelerated by adding an active oxidizing agent.

8. A method in accordance with claim 2 and in which the accelerating means comprises manganese dioxide and sodium sulphite.

9. The method of producing upon the approximately clean surface of a metal of the group consisting of iron, steel, zinc and their alloys, an oxalate coating, which consists in subjecting the surface to a solution containing as its chief active chemicals oxalic acid and an oxidizing agent.

10. The method of producing upon the approximately clean surface of a metal of the group consisting of iron, steel, zinc and their alloys, an oxalate coating, which consists in subjecting said surface to a solution of axalic acid containing in solution a compound of one or more of the metals manganese, copper, chromium or silver.

11. A method in accordance with claim 10 and in which the action is accelerated by the addition of an oxidizing agent.

12. A method in accordance with claim 10 and in which the action is accelerated by the addition of manganese dioxide and sodium sulphite.

13. The method of producing on a surface of iron or steel, an oxalate coating which consists in subjecting the surface to a pickling acid for a brief period, rinsing the surface and thereafter subjecting it to the action of a solution of oxalic acid containing a compound of manganese dissolved therein and an active oxidizing agent.

14. The method of coating a metal of the group consisting of iron, steel, zinc and their alloys, which consists in subjecting the surface of the metal to a solution the major active chemical of which is gallic acid and which contains an oxidizing agent, and continuing the action of the solution on the surface until a coating of a gallate of the metal is formed suitable for bonding paint.

15. A method in accordance with claim 14 and in which sodium sulphite is used as the oxidizing agent.

16. The method of coating a metal of the group consisting of iron, steel, zinc and their alloys, which consists in subjecting the surface of the metal to a solution the major active chemical of which is gallic acid and which contains a compound of a metal of the group consisting of manganese, copper, chromium and silver, and continuing the action of the solution on the surface until a coating of a gallate of the metal is formed suitable for bonding paint.

17. A method in accordance with claim 16 and in which manganese dioxide is used as the metallic compound.

18. The method of coating a metal of the group consisting of iron, steel, zinc and their alloys, which consists in subjecting the surface of the metal to a solution the major active chemical of which is gallic acid and which contains an oxidizing agent and a compound of a metal of the group consisting of manganese, copper, chromium and silver, and continuing the action of the solution on the surface until a coating of a gallate of the metal is formed for bonding paint.

19. A method in accordance with claim 18 and in which the oxidizing agent is sodium sulphite and the metallic compound is manganese dioxide.

20. A method in accordance with claim 18, and in which there is added to the solution an amount of phosphoric acid which is small in proportion to the gallic acid present.

21. A solution for coating a surface of a metal of the group consisting of iron, steel, zinc and their alloys, which solution contains, as the major portion of its active chemical, an acid of the group consisting of dicarboxylic and hydroxydicarboxylic acids of the aliphatic series and carboxylic acids containing but one carboxyl group and sulphonic acids of the aromatic series, and an accelerator of the group consisting of oxidizing agents and compounds of manganese, copper, chromium and silver.

22. A solution in accordance with claim 21, and in which the accelerator comprises an oxidizing agent.

23. A solution in accordance with claim 21 in which the major acid is oxalic acid and the accelerator comprises an oxidizing agent.

24. A solution in accordance with claim 21 in which the major acid is oxalic acid and the accelerator comprises sodium sulphite.

25. A solution in accordance with claim 21 in which the major acid is gallic acid and the accelerator comprises an oxidizing agent.

26. A solution in accordance with claim 21 in which the major acid is gallic acid, the accelerator comprises an oxidizing agent, and phosphoric acid is present in an amount small in proportion to the gallic acid.

27. A solution in accordance with claim 21 and in which the accelerator comprises a compound of a metal of the group consisting of manganese, copper, chromium and silver.

28. A solution in accordance with claim 21 in which the major acid is oxalic acid and the accelerator comprises a compound of a metal of the group consisting of manganese, copper, chromium and silver.

29. A solution in accordance with claim 21 in which the major acid is gallic acid and the accelerator comprises a compound of a metal of the group consisting of manganese, copper, chromium and silver.

30. A solution in accordance with claim 21 and in which the accelerator comprises an oxidizing agent and a compound of a metal of the group consisting of manganese, copper, chromium and silver.

31. A solution in accordance with claim 21 in which the major acid is oxalic acid and the accelerator comprises an oxidizing agent and a compound of a metal of the group consisting of manganese, copper, chromium and silver.

32. A solution in accordance with claim 21 in which the major acid is gallic acid and the accelerator comprises an oxidizing agent and a compound of a metal of the group consisting of manganese, copper, chromium and silver.

33. A solution in accordance with claim 21 and in which the major acid is gallic acid and the accelerator comprises sodium sulphite and manganese dioxide.

In testimony whereof I have hereunto signed my name to this specification.

ROBERT R. TANNER.